Oct. 28, 1969  W. D. ALLINGHAM  3,474,513
METHOD OF FABRICATING A CORED STRUCTURE
Filed April 7, 1967  3 Sheets-Sheet 1
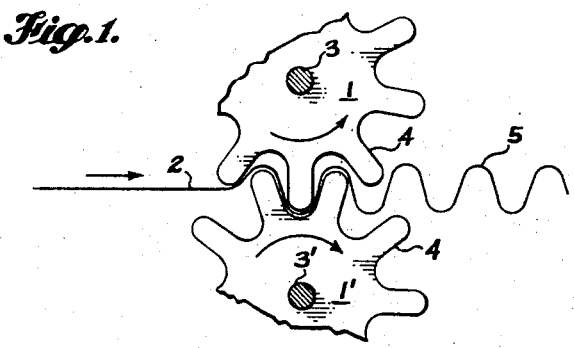
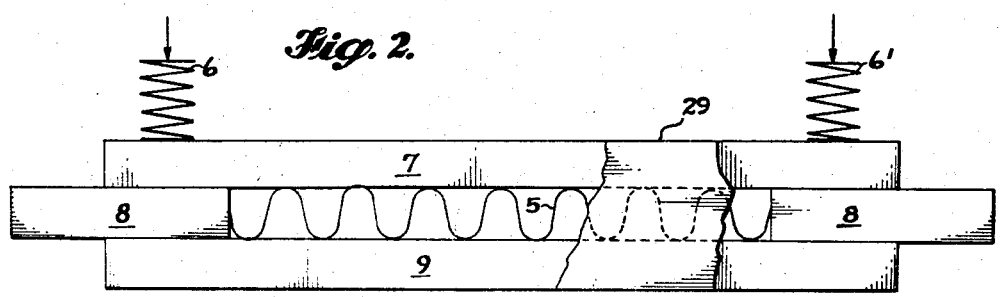
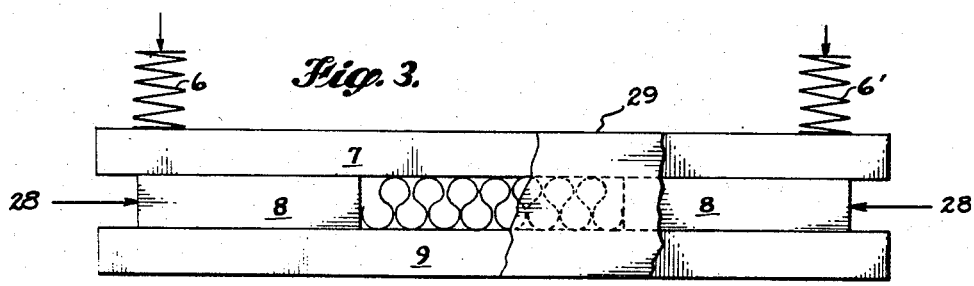
INVENTOR.
WILLIAM D. ALLINGHAM
BY
*Ray E. Matthews, Jr.*
ATTORNEY Oct. 28, 1969         W. D. ALLINGHAM            3,474,513
              METHOD OF FABRICATING A CORED STRUCTURE
Filed April 7, 1967                          3 Sheets-Sheet 2
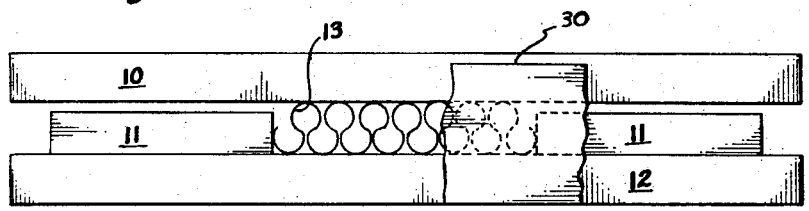
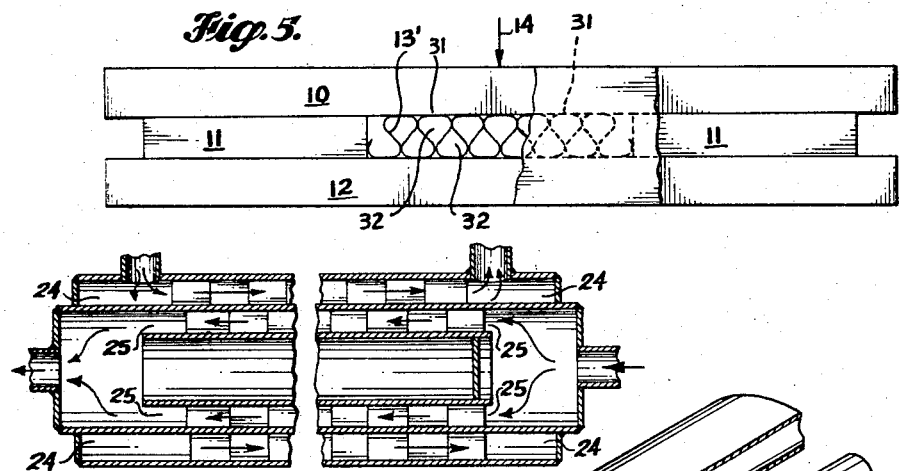
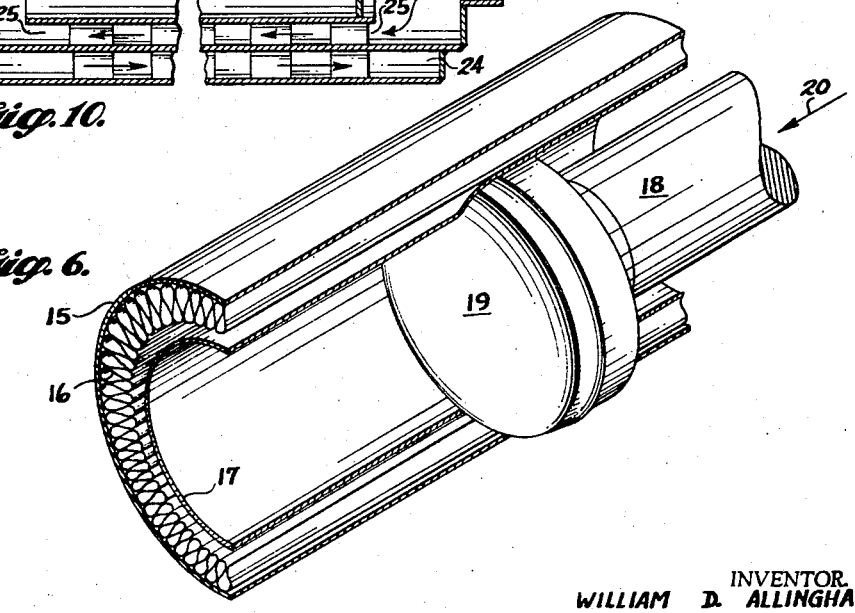
INVENTOR.
WILLIAM D. ALLINGHAM
BY
Roy E. Mattern, Jr.
ATTORNEY Oct. 28, 1969     W. D. ALLINGHAM     3,474,513
METHOD OF FABRICATING A CORED STRUCTURE
Filed April 7, 1967     3 Sheets-Sheet 3
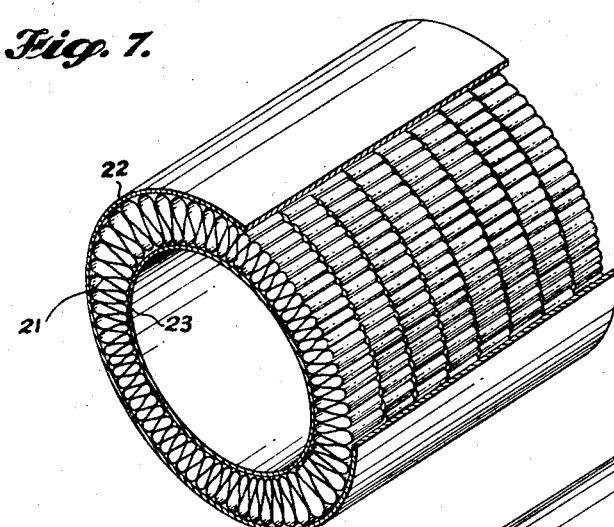
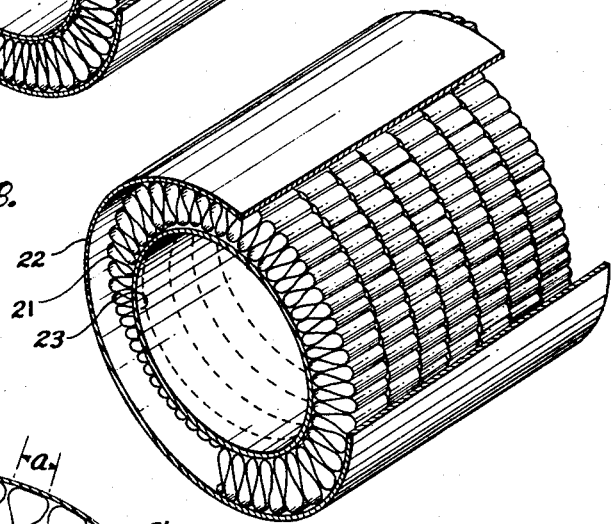
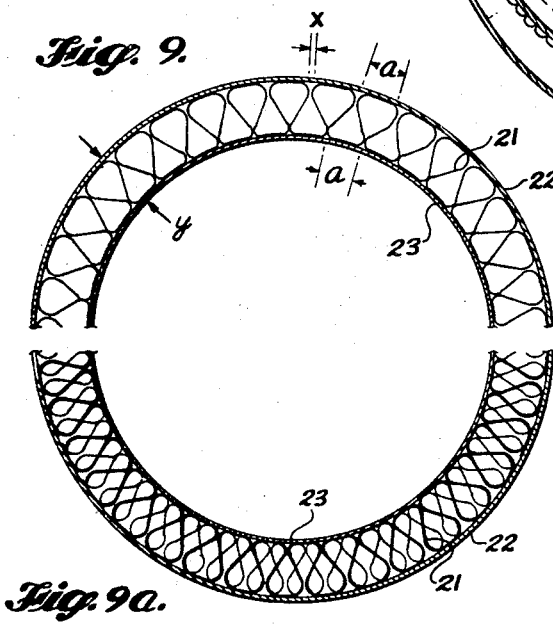
INVENTOR.
WILLIAM D. ALLINGHAM
BY
Roy E. Mattern, Jr.
ATTORNEY

United States Patent Office 3,474,513
Patented Oct. 28, 1969

3,474,513
METHOD OF FABRICATING A CORED STRUCTURE
William D. Allingham, 12223 25th SW., Seattle, Wash. 98146
Filed Apr. 7, 1967, Ser. No. 629,881
Int. Cl. B23p 15/26
U.S. Cl. 29—157.3                              6 Claims

ABSTRACT OF THE DISCLOSURE

Core materials, adapted for inclusion in overall structures becoming themselves strength members of the overall structures, are formed from strip and sheets of principally metal materials. They are formed by first passing them through spaced gear like formers to create corrugations. Thereafter, in the presence of transverse restraints, longitudinal compressive forces are applied to move the sinosoidal corrugations into closely arranged figure eight configurations. Subsequently, in the presence of longitudinal restraints of restricted elevation transverse compressive forces are applied to move the convex outer surfaces of the slanted figure eight corrugations into substantially parallel surfaces.

In one resulting product these core materials, as the primary heat transfer surface materials, are placed between supporting surfaces that will continue on in transferring heat. Heat exchangers, often tubular, are formed by this method, as an outer supporting surface is held, then core materials are arranged inside and an inner supporting surface is radially expanded to compress the core materials between the outer and inner supporting surfaces.

Sufficient compression occurs to cause plastic deformation insuring excellent contact of core materials with the supporting materials, yet the overall structure remains sound and strong as a structural unit while serving efficiently as a heat exchanger. No fusion materials are required thereby eliminating brazing. If greater surface to surface contact is desired, a soft metal such as indium is inserted or selectively coated before plastic deformation is undertaken. It is therefore also subject to the plastic deformation forces and thermal conductance is further improved, still without resulting to any brazing or other heat fusion procedures during assembly of the overall structure.

---

This invention relates to a method for manufacturing a cored structure for heat exchangers in an economical way resulting in a more effective heat exchange between fluids, or between a fluid and a heating or cooling unit.

A product made using this method is described in the abandoned application identified as follows: Applicant, William D. Allingham, Ser. No. 350,312, filed Mar. 9, 1964, for Core Material and Built Up Structure and Method for Manufacturing Same.

Objects of the method of this invention are: To produce an improved cored structure for heat exchangers capable of fabrication with a large heat transfer surface area per unit volume of the core; that is, in excess of 1700 square feet of heat transfer surface area per cubic foot of volume. Such a structure is very desirable in applications where compactness and light weight are required;

To produce a core material having greater contact area with the fluid passage walls and thereby capable of efficient heat transfer between the core and passage walls without the use of brazing and related procedures for metal bonding of core materials. The advantages of such a structure are lower initial fabrication costs with less chance of faults or flaws occurring in the manufacturing process;

To produce a core having a truss-like figure eight form structure with greater load-supporting and transmitting capabilities. The advantages of such a structure are greater support to the fluid passage walls when a large pressure differential exists between adjacent passages, as well as the capability for achieving greater contact pressure between the core and passage wall, as the figure eight form is compressed, to obtain improved heat transfer between them;

To achieve a variety of the overall sizes and arrangements of the heat exchanging elements without changing the method of manufacturing core materials or appreciably lessening the strength of the core materials;

To produce a cored structure possessing sufficient geometrical uniformity to permit an accurate prediction of certain design parameters such as heat exchange rate, fluid pressure drop, and structural strength; and To produce a cored structure economically with relatively simple and inexpensive tooling.

Other objects and advantages of this invention will become apparent from the following description, drawings and appended claims.

FIGURE 1 illustrates the initial step of corrugating sheet stock in my method of manufacturing core materials.

FIGURE 2 represents a subsequent step in my method of manufacturing core materials wherein an assembly is used for the application of longitudinal pressure.

FIGURE 3 depicts the result of FIGURE 2 after the complete application of longitudinal pressure.

FIGURE 4 represents another subsequent step wherein an assembly is used for the application of transverse pressure.

FIGURE 5 shows the result of FIGURE 4 after the complete application of transverse pressure.

FIGURE 6 is a perspective view of a heat exchanger structure wherein a mandrel is used to force the supporting sheets of metal into permanent contact with the core material.

FIGURE 7 is a perspective view of a cylindrical type heat exchanger core wherein the corrugated core strips are assembled as abutting rings having a common axis.

FIGURE 8 is a perspective view of cylindrical type heat exchanger core wherein the corrugated core strips are helically wound.

FIGURE 9 illustrates part of a cylindrical form of a cored structure fabricated by this method, as seen in an end view, wherein the core is formed from a single corrugated strip.

FIGURE 9a illustrates part of a cylindrical form of the cored structure fabricated by this method, as seen in an end view, wherein the core is composed of more than one corrugated strip and the strips are staggered with respect to one another.

FIGURE 10 represents the directional flow pattern through a truncated heat exchanging unit.

This method is directed to the production of heat exchangers. With regard to the general aspects of heat exchangers, the fluid passage walls of a heat exchanger which separate two fluids between which heat is transferred are in direct contact with each fluid and therefore such walls may be considered as primary heat transfer surfaces. Other walls which form the envelope of the heat exchanger may be considered as supporting surfaces. The heat transfer rate is directly proportional to the primary heat transfer surface area and therefore an increase of this surface area within a confined space will achieve an increase of the heat transfer rate.

Before this method was practiced, anticipated increased costs prohibited the increase in primary heat transfer surface area. Therefore, it was common to employ secondary heat transfer surfaces in the form of fins extending from the primary heat transfer surfaces. Due to past manufacturing limitations it was frequently impractical to form passage walls and fins from a single piece of material, hence a bond was employed between the finned core and the passage wall. It was essential, for efficient heat transfer operations, to achieve a good thermal bond across these interfaces.

Continuing with respect to prior methods and the results obtained, extended surface heat exchangers were frequently produced by stacking layers of thin metal corrugations between adjacent metal sheets to produce a finned core structure. Good heat transfer between the corrugated sheets, which form the extended finned surfaces, and the passage walls was only achieved by bonding the contacting surfaces using a dip brazing process. In such a brazing process, the core assembly was immersed in a molten salt bath. The salt bath temperature was sufficiently high to melt a fusible metal sheet or coating at the interface between the contacting surfaces, but it was below the melting temperature of the core materials. When the fusible material had melted, the core assembly was removed from the bath and molten salt was allowed to drain from the assembly. All of the molten salt had to be removed so that the fluid flow passages would be free of obstructions. Complete removal of the salt from the small interstices of the core assembly was difficult and time consuming.

In contrast, the present invention discloses a method for producing efficient extended surface heat exchangers without brazing, thus eliminating the time and expense of the brazing process and the subsequent cleaning operation. Elimination of brazing is achieved during assembly of the components by forcing the passage walls against the contacting surfaces of the core material with sufficient contact pressure to achieve a good thermal conductance between the core materials and passage wall. Attempts to eliminate brazing have been tried before and as discussed by Holm in Patent 2,692,763, he found it most difficult to achieve a sufficient contact pressure for good thermal conductance between the core materials and fluid passage wall when he used conventional corrugated materials for core material.

The difficulties encountered are due to buckling and distortion of the transverse portions of the core materials. Therefore, this invention provides a novel method for producing an improved core material which will not buckle and distort and be formed to achieve the good thermal conductance that is wanted. Conventional corrugated sheet is compressed to form a truss-like structure of corrugations having a cross sectional appearance of a figure eight with flattened contacting surfaces, as shown in FIGURE 9. Such a cored material in its structural environment is especially suited for achieving efficient heat transfer between the core and passage wall without brazing. This is true because of (1) the larger contact area between the core material and passage wall, and (2) the truss-like structure of the core material which permits application of greater contact pressure at adjoining surfaces without a buckling of the core material. When core material is made in accordance with the teachings of this invention, the effective area of heat transfer contact approaches 100 percent of the passage wall area.

In addition to the aforementioned means for increasing the thermal conductance between the core materials and passage walls, the contacting surfaces may be coated with a soft metal, such as indium, to increase the thermal conductance. If the contacting surfaces are of a soft metal, for a given magnitude of contact pressure, the degree of flattening of the small asperities on the surfaces is increased. Thus the area on the surfaces where actual metal-to-metal contact occurs is correspondingly increased and the heat transfer rate is improved. Also, in regard to all metals, smooth, clean contacting surfaces are very beneficial for acquiring good thermal conductance.

In the drawings, this method is illustrated in conjunction with the manufacture of tubular heat exchangers. During the manufacture, large contact pressures between contacting surfaces are very easily achieved by employing mechanical means.

The figures of these drawings show this method of making core materials in a series of steps. The first step in my process, shown in FIGURE 1, is the corrugation of sheet metal. The basic apparatus employs a rotatably mounted wheel cooperating with a correspondingly mated rotatably mounted wheel, each of the wheels 1 and 1' having respective mountings 3 and 3' as well as drive means for turning said wheels. These two mating wheels 1 and 1' have a multiplicity of well-defined teeth protruding therefrom as shown by 4. During their relative rotations, very satisfactory performance is achieved if their mountings are spring-loaded and their teeth are contoured. There is no cutting of the material as it is transformed from sheet material into corrugations. Sheet metal 2 is fed into the rolls in the direction of rotation of the wheels thereby forming the corrugations 5. It should be noted that the corrugation is made to achieve eventually a figure eight configuration for the core material.

FIGURES 2 and 3 depict the next step of longitudinally compressing the corrugations. In FIGURE 2, the corrugations are secured between two bars 7 and 9 with the bars 8 being adjacent to the ends of the corrugated sheet 5. Guide plates 29 are provided to position the bars 8 and to maintain the edges of the corrugated sheet 5 in alignment during the compacting step. The forces 6 and 6' represent a clamping device, such as a compressed spring, sufficient to hold the corrugated sheet 5 within the bars 7 and 9 and to prevent transverse buckling during the compacting step. FIGURE 2 represents the initial assembly for the compression of the corrugations while FIGURE 3 represents the assembly after compression by forces 28. By maintaining a fixed ratio between the initial and compressed lengths, the core configuration can be duplicated with precision.

The next step is to transversely compress the corrugated sheet 5 as shown in FIGURES 4 and 5. Referring to these figures, the corrugated sheet 13 is placed on base bar 12 with bars 11 placed adjacent to each end of the corrugated sheet 13. As shown in FIGURE 4, bars 11 are not as deep as the overall depth of the corrugated sheet 13, which difference allows for compression of the corrugations. Guide plates 30 are provided to position the top bar 10 and to maintain the alignment of the corrugated sheet 13 during the compacting step. Next, bar 10 is placed on the corrugated sheet and load 14 is applied until bar 10 abuts the bars 11, thus compressing the corrugated sheet 13 to 13' as illustrated in FIGURE 5. The characteristic features of the fully compacted corrugated sheet 13' are the flattened crests 31 which form the bases of the new triangularly shaped portions 32. The almost triangular portions 32 form a basic truss-like structure which gives the core material of this figure eight configuration its compressive strength.

The next step is to assemble the compacted core material in engagement with a primary heat transfer surface so as to have a high contact pressure between the flattened crests 31 and the fluid passage walls of a heat exchanger which are the primary heat transfer surfaces. For a cylindrical type heat exchanger, a preferred method of performing this step is shown in FIGURE 6. In FIGURE 6, the cylinders 15 and 17 represent the primary heat transfer surfaces of a heat exchanger. Cylinder 17 has the core material 16 so placed as to be loosely wrapped around cylinder 17 and the combination thus formed placed within cylinder 15. The outside diameter of cylinder 17 is slightly smaller than the inner diameter of the cylinder formed by the core material 16, there being just sufficient radial clearance to permit easy assembly of the components. Next, cylinder 17 is plastically deformed to effect a contact pressure bond between the cylinder walls and the core material 16. The plastic deformation of cylinder 17 is performed by applying force 20 to shaft 18 of mandrel 19 thereby driving the mandrel through the entire length of cylinder 17.

The above steps have been described for a preferred embodiment, but variations of this invention may be practiced without departing from the spirit thereof. In some instances the transverse compaction of the corrugations shown by FIGURES 4 and 5 can be accomplished during the operation shown in FIGURE 6 wherein the core is compressed between two exterior supporting sheets. It is also possible to achieve multiple stacking of core material units instead of the one unit shown in FIGURE 6. In the case of cylindrical units, assembly as performed first of the core in the largest annulus, then the assembly steps are repeated for the next inner annulus. Also, although FIGURE 1 shows a preferred method of producing the corrugations, it is possible to produce the corrugations by other means, as noted above. While the compacting and assembling steps would remain basically the same, the final configuration of the core material can be varied.

FIGURES 7 and 8 show how the core material can be wrapped or arranged around the supporting sheets. FIGURE 7 illustrates an element where the core materials are wrapped at right angles to the axes of the supporting cylindrical sheets, while FIGURE 8 has the core materials wound in a helical pattern as they are supported by the cylindrical sheets.

FIGURE 9 represents a typical end view, in part, of a heat exchanger element of this invention wherein the core material 21 is fabricated of a single sheet and is compressed between the two cylindrical sheets 22 and 23 acquiring spaces somewhat triangular in appearance resulting from the figure eight configuration. The letter *a* represents the widest part of the core material, with *x* representing a gap between the outer corrugations when the core material is assembled into a curved core structure. Naturally, *a*, *x*, and the configuration of the core material can be varied within the scope of this invention as discussed previously. Where 23 is of a small radius, or in cases where *y* is large, the ratio *x*/*a* may become too large. In such cases it can be proved that the outer side of the corrugations has a contact width approaching *x* plus *a* while the inner contact width equals *a*.

FIGURE 9a shows an end view, in part, similar to FIGURE 9 with the core composed of more than one corrugated strip staggered with respect to one another such as that shown by FIGURE 7, or a helically wound strip as shown in FIGURE 8.

To illustrate a final installation in a product, of materials produced by this method, FIGURE 10 presents a sectional view of an operating heat exchanger with fluids flowing in a counterflow arrangement through cavities 24 and 25 which are filled with the core materials fabricated by method of this invention.

In addition to economy of manufacture, numerous other advantages result from the practice of this invention. There is the elimination of any need to braze or to bond materials together. Fabrication by this method produces a non-rigid joint between the core and passage walls resulting in excellent performance of heat exchangers under conditions of thermal cycling which otherwise would produce thermal stresses resulting in structural failure if the structure had been made rigid. Also, the elimination of any brazing enables the fabrication of heat exchangers from new materials for which bonding techniques have not been developed.

The staggered core material construction shown by FIGURE 9a provides controllable degrees of turbulence and fluid mixing often required for efficient heat transfer and does so with a minimal pressure drop. This is due to the maintenance of a uniform cross-sectional area of passage normal to the flow direction, thereby eliminating abrupt expansions and contractions in the passage cross-section which contribute appreciably to pressure losses. Other advantages, which are realized with the concentric tubular construction, are the greater efficiency of counter flow heat exchange and the adaptability of tubular construction to withstand high pressures.

It will be noted that the novel compressed corrugated core material achieves its most useful characteristics when used in combination with at least two supporting surfaces to form cored structures. The resulting cored structure made by the method of this invention has excellent structural properties. For example, a tubular structural member comprising a pair of thin concentric tubes with a supporting core in the annular space between the tubes withstands large torsional and tensile loads. Also this tubular cored member is much more resistant to buckling under axial compressive loads or bending loads. The core in this tubular member could be a single corrugated sheet extending the entire length of the tube for maximum strength.

While I have described and illustrated some preferred forms of my invention, it should be understood that many modifications may be made without departing from the spirit and scope of the invention, and it should therefore be understood that this invention is limited only by the scope of the appended claims.

I claim:

1. A method of manufacturing a structure suitable for heat transfer purposes and having improved structural properties, said method comprising:
    (a) passing a flat sheet of core material between near contacting gear like rotating formers to create sinosoidal corrugations;
    (b) applying transverse restraining forces to the corrugations;
    (c) applying longitudinal compressive forces to the corrugations, while the transverse restraining forces are being applied, to move the initial sinosoidal corrugations into closely arranged figure eight configurations;
    (d) removing both the initially applied transverse restraining forces and the longitudinal compressive forces from the corrugations;
    (e) applying longitudinal restraints to the corrugations to be effective only in a restrictive transverse elevation less than the corrugation thickness;
    (f) placing a first supporting material in a firmly backed up position;
    (g) placing the corrugated core material adjacent to the first supporting material;
    (h) placing a second supporting material adjacent to the core material;
    (i) applying a compressive force against the second supporting material into contact with the core material so as to deform all three materials and to effect a pressure bond between the materials, said core material having a cross section appearance of a figure eight with flattended contacting surfaces; and
    (j) removing the compressive force.

2. In the method of manufacturing a structure as claimed in claim 1, extending the method to acquire greater surface to surface contact areas by placing a soft metal, such as indium, between materials before applying the compressive force that compressively deforms both the second supporting material and the core material as they are driven into contact with the first supporting materail creating the overall structural material.

3. In the method of manufacturing a structure as claimed in claim 1, extending the method to form tubular heat exchanger structures by obtaining tubular first and second supporting materials and then preforming the core material into a hollow cylindrical member before placing it adjacent to the first supporting material.

4. In the method of manufacturing a structure as claimed in claim 3, preforming the core material into multiple hollow cylindrical members when more are needed positioned adjacent to one another, to match the respective overall lengths of the first and second tubular structures.

5. In the method of manufacturing a structure as claimed in claim 4, intentionally non aligning the flattened crest figure eight configurations of the multiple hollow cylindrical core members to present an axially staggered core material construction.

6. In the method of manufacturing a structure as claimed in claim 3, preforming the core material into a hollow center spirally wound cylinder to substantially match the respective overall lengths of the first and second tubular structures.

References Cited

UNITED STATES PATENTS

| | | | |
|---|---|---|---|
| 1,512,295 | 10/1924 | Massey. | |
| 2,252,209 | 8/1941 | Shank et al. | 113—118 |
| 3,005,036 | 10/1961 | Mowatt. | |
| 3,021,804 | 2/1962 | Simpelaar | 112—118 |
| 3,191,418 | 6/1965 | Modine. | |
| 3,310,868 | 3/1967 | La Porte et al. | 29—157.3 |
| 2,406,051 | 8/1946 | Weiss. | |
| 2,485,969 | 10/1949 | Johnson | 72—379 X |
| 2,882,588 | 4/1959 | Rieppel et al. | |
| 3,237,297 | 3/1966 | Rowland | 29—470.1 |

JOHN F. CAMPBELL, Primary Examiner

D. C. REILEY, Assistant Examiner

U.S. Cl. X.R.

29—455, 470.1; 72—379; 113—118